March 25, 1941.  K. E. WHITNEY ET AL  2,235,954
EFFECTIVE TEMPERATURE INDICATOR
Filed Nov. 22, 1938
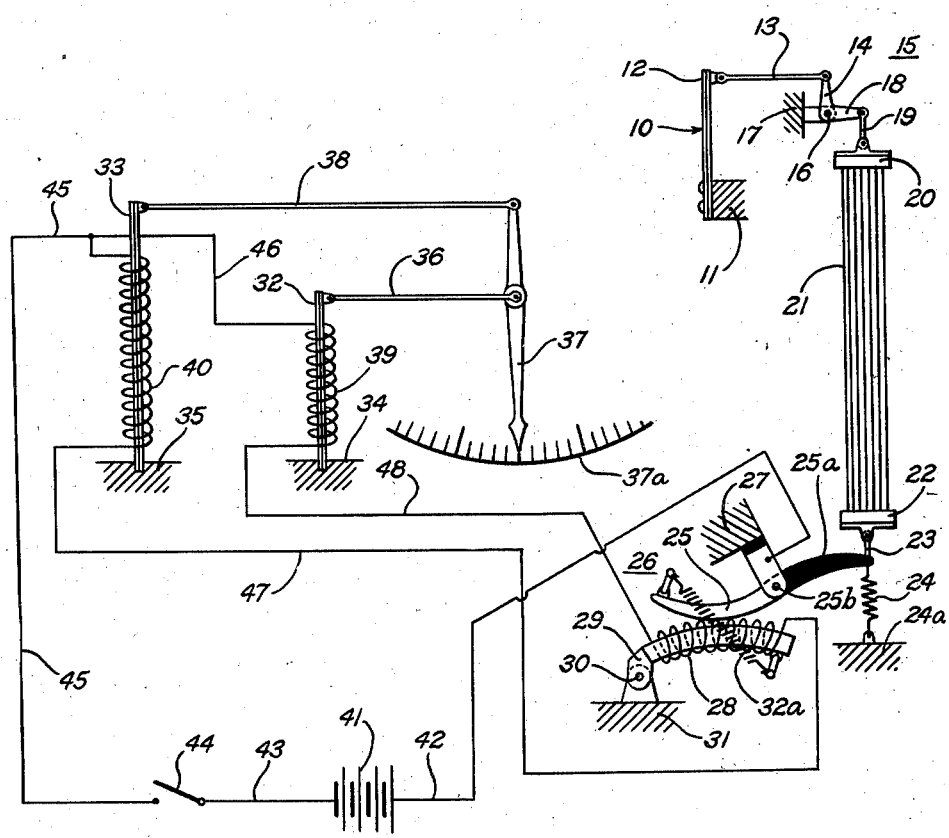
INVENTORS.
Kenneth E. Whitney
Ralph R. Chappell
BY Stephen Cerstvik
ATTORNEY.

Patented Mar. 25, 1941

2,235,954

UNITED STATES PATENT OFFICE 2,235,954

EFFECTIVE TEMPERATURE INDICATOR

Kenneth E. Whitney, Baltimore, Md., and Ralph R. Chappell, Richmond, Va., assignors to Bendix Aviation Corporation, South Bend, Ind., a corporation of Delaware Application November 22, 1938, Serial No. 241,874

2 Claims. (Cl. 73—336)

The present invention relates to temperature indicators and more particularly to means for indicating the effective temperature or comfort condition which is a combination of humidity and temperature effects.

Such a comfort condition has been designated by the American Society of Heating and Ventilating Engineers as the "effective temperature" and is defined as an experimentally determined temperature which, unlike the dry-bulb and wet-bulb temperatures, is a true indication of a person's feeling of warmth in all combinations of humidity and air motion. Reference is made to pages 313 to 340 inclusive, of the 1933 Guide of the American Society of Heating and Ventilating Engineers, for details as to how "effective temperature" tables have been arrived at and their relation to a feeling of comfort by the human body. In other words, the comfort condition is a physiological condition pertaining to the reaction of the human body to the particular conditions of temperature and humidity maintained within a room. While the temperature per se may be higher or lower in actual degrees than those which we have been accustomed to consider as comfortable, the humidity is so proportioned to the particular temperature that the human body feels neither warm nor cold but "just right."

The invention embodies a novel combination of means responsive to humidity, means responsive to temperature, and means controlled by the combined effect of the humidity and temperature responsive means whereby the effective temperature or comfort condition conforming to the particular values of humidity and temperature is indicated.

In devices of the prior art, means responsive to changes in temperature and means responsive to changes in humidity have been combined in order to produce a control device for maintaining a predetermined comfort condition. In these devices of the prior art a certain desired comfort condition or status has been maintained and there has been no means for indicating the value of the particular comfort condition which was being maintained. Further, the specific purpose of these devices of the prior art has been to maintain the same condition of comfort regardless of just what that particular condition of comfort was. While the maintenance of such a condition is primarily the purpose of the controls, it becomes desirable to know also what particular comfort condition or effective temperature is being maintained. This information is desirable when the cost of operation of the particular equipment which controls the comfort condition becomes the controlling factor.

Under certain conditions of operation, or with the use of certain equipment, it may be more economical to operate the temperature controlling apparatus at or near its maximum and thereby maintain a certain comfort condition or effective temperature. Under other conditions of operation, the cost of operating the humidity controlling device may be much lower than a commensurate operation of the temperature controlling device and it would become desirable to maintain under those conditions a different comfort condition. It becomes necessary, therefore, to indicate to the operator just what particular comfort condition or just what effective temperature is being maintained in order that he can ascertain quickly whether the particular comfort condition is that which is most economical for the equipment in use.

Accordingly, one of the objects of the present invention is to provide a novel combination whereby various comfort conditions or effective temperatures are indicated.

Another object is to provide novel electrical means whereby various comfort conditions or effective temperatures are indicated.

Still another object is to provide novel means for indicating effective temperatures in combination with means whereby said indicating means are not adversely affected by changes in the ambient temperature.

A still further object is to provide novel electrical means for indicating comfort conditions or effective temperatures wherein changes in condition of the electrical power source will not affect the accuracy of the indication.

The above and further objects and advantages of the invention will appear more fully hereinafter from a consideration of the detailed description which follows, taken together with the accompanying drawing wherein one embodiment of the invention is illustrated. It is to be expressly understood, however, that the drawing is intended for purposes of illustration and description only, and is not designed as a definition of the limits of the invention, reference being primarily had for this purpose to the appended claims.

In the drawing, the single view represents diagrammatically one form of applicants' novel indicating system.

The novel means of the present invention comprise a pair of sensitive elements responsive to changes in temperature and humidity, which may comprise, respectively, a bi-metal element responsive to changes in temperature and an element of hygroscopic material such, for example, as strands of human hair, responsive to changes in humidity. Means are provided which are controlled by the joint effect of the temperature and humidity sensitive elements to produce variations in electrical energy in accordance with the combined effects of said elements. These means comprise a novel arrangement whereby changes in the ambient temperature and changes in the source of electrical energy are balanced out, while changes in the condition of the temperature and humidity sensitive elements are differentially combined to produce a force which is a function of a definite ratio of the respective changes.

Referring to the drawing, the bi-metal element is shown as comprising a bi-metal strip 10 fixedly mounted at one end thereof to a relatively fixed support 11, the other end 12 of said strip 10 being movable upon changes in temperature. The movable end 12 is connected by the articulated link 13 to one arm 14 of a bell-crank 15 pivotally mounted at 16 to a fixed member 17. The other arm 18 of the bell-crank is connected by the articulated member 19 to one end 20 of a hygroscopic element 21.

The hygroscopic element comprises, in the present instance, a plurality of human hairs or other strands of hygroscopic material, and is connected at the other end 22 by an articulated link 23 to a spring element 24 which, in turn, is connected to a relatively fixed support 24a. Link 23 is also connected to an insulated end 25a of a rocker-cam 25 which comprises part of a rheostat 26 of the type shown and described in the copending application of Ralph R. Chappell, Serial No. 241,875, filed November 22, 1938.

Rocker-cam 25 is pivoted at 25b on a fixed support 27, whereby the conductive end of said rocker-cam oscillates over a resistor 28 mounted on an insulated cooperating cam 29 pivotally mounted at 30 on a fixed support 31. A spring 32a urges the cam elements 25 and 29 together at all relative positions of said cams.

Means are now provided for utilizing the combined effect of the temperature responsive element 10 and the humidity responsive element 21 on the rheostat 25 to indicate changes in temperature and humidity in terms of effective temperature. In the form shown, said indicating means comprise a pair of bi-metal elements 32 and 33 which are fixedly mounted at one end thereof to the fixed supports 34 and 35 respectively. The free end of the bi-metal element 32 is connected by the articulated link 36 to a point on the pointer 37, while an articulated link 38 connects the free end of bi-metal element 33 to the end of pointer 37 which is thereby mounted for rotary movement over a scale 37a. A heater comprising an electrical resistance element 39 is placed in heat-conducting relationship to the bi-metal element 32, and a second heater comprising a resistance element 40 is similarly located adjacent the bi-metal element 33. A source of electrical energy 41 is connected at one side thereof by a conductor 42 to the rocker-cam 25. The other side of said source is connected by a conductor 43, switch 44 and conductors 45 and 46 to one of the ends of each of the heating elements 40 and 39 respectively. The other end of heating element 40 is connected by the conductor 47 to one end of the resistor 28, while the corresponding end of the heating element 39 is connected by conductor 48 to the other end of resistor 28.

The ratios of the lengths of the links 36 and 38 and of the bi-metal elements 32 and 33 are such that the movements of said bi-metal elements due only to changes in the ambient temperature are balanced out, while the movements of said elements due to temperature changes of the heating elements 39 and 40 actuate the pointer 37 over scale 38, thus eliminating the effects of changes in ambient temperature.

The operation of the system is as follows:

When switch 44 is closed, electrical energy flows from one side of source 41 through the conductor 42, the conductive end of rocker-cam 25, the left hand portion of resistor 28, conductor 48, heater 39, conductors 46 and 45, switch 44 and conductor 43 back to the other side of source 41.

Electrical energy also flows from one side of source 41 through the conductor 42, rocker-cam 25, the right hand portion of resistor 28, conductor 47, heater 40, conductor 45, switch 44 and conductor 43 back to the other side of source 41.

When that portion of resistor 28 in series with heater 39 is equal to the portion thereof in series with heater 40, the amount of current passing through the heaters 39 and 40 respectively, affect the bi-metal elements 32 and 33, respectively, to such an extent that the motion of the free end of bi-metal element 32 conducted to the pointer 37 by element 36 just equals and off-sets the motion transmitted from the free end of bi-metal element 33 by link 38 to the end of pointer 37. Pointer 37, therefore, assumes a position as shown in the drawing.

Neglecting the effects of elements 10 and 21 and considering the changes in ambient temperature alone upon the bi-metal elements 32 and 33, these latter elements are actuated upon changes in ambient temperature so that the relative movements transmitted to the pointer 37 equalize and balance out due to their differential action upon said pointer. For example, if a change in one degree of the ambient temperature moves the free end of the bi-metal element 32 to the right, this motion will be transmitted by link 36 to the pointer 37 to tend to move this pointer counter-clockwise if we consider the link 38 as being stationary. Simultaneously with the movement of the free end of bi-metal element 32 however, the free end of bi-metal element 33 is moved a greater distance to the right due to its greater length, which movement is transmitted by the link 38 to the end of pointer 37 so that the pointer 37 will tend to move in a clockwise direction if we consider link 36 as being stationary. The combined movements of links 38 and 36, however, prevent any relative rotation of the pointer 37 so that the pointer indicates the same effective temperature regardless of the direct effect of the ambient temperature changes upon the bi-metal elements.

Upon a change in relative humidity, the hair elements 21 expand or contract to move the link 23, to rock the rocker-cam 25 about its pivot 25b, whereby the amount of resistance in series with the heater 39 becomes different than the amount of resistance in series with heater 40. The relative heating effects of the heaters 39 and 40 are thereby varied so that the motions of the free ends of the bi-metal elements transmitted to the pointer 37 no longer balance out since the currents through the heaters 39 and 40 are no longer equal. These unequal movements of the bi-metal elements rotate the pointer 37 either clockwise or counter-clockwise to indicate the particular value of the effective temperature.

Upon a change in temperature, the free end of the bi-metal element 10 is moved and its movement is transmitted by the link 13, bell-crank 15, humidostat 21, end 22 and link 23 to the rocker-cam 25 to rock said cam about its pivot 25b so that the current through the heaters 39 and 40 is varied, this variation being proportional to the change in dry-bulb temperature and the humidity at that temperature and is indicated on the scale 37a by pointer 37.

Upon changes in both temperature and humidity, the elements 10 and 21 are both actuated and their resultant movement in amplitude and direction is conveyed to the rocker-cam 25, whereby the current through the heaters 39 and 40 is varied in proportion to the change in the effective temperature and the pointer 37 is actuated accordingly.

Novel means are thus provided whereby changes in effective temperature are indicated, together with means whereby said indicating means are not affected by changes in the ambient temperature or by changes in the energy source used to produce the indications of effective temperature.

Although but one embodiment of the invention has been illustrated and described, various changes and modifications in form, materials and relative arrangement of parts, which will now appear to those skilled in the art, may be made without departing from the scope of the invention. Reference is, therefore, to be had to the appended claims for a definition of the limits of the invention.

What is claimed is:

1. In combination, means responsive to changes in temperature, means responsive to changes in humidity connected to said temperature responsive means, a rotatable pointer movable over a scale, a pair of spaced elongated bimetallic elements fixed at one end and arranged in parallel to move in one direction upon an equal increase in temperature and in an opposite direction upon an equal decrease in temperature, one of said bimetallic elements being shorter than the other, means connecting said bimetallic elements to said pointer comprising a pair of articulated links, one of said links connecting the free end of the longer bimetallic element to one end of the pointer, the other of said links connecting the free end of the shorter bimetallic element to the pointer at an intermediate portion thereof, the ratio of the length of one of said elements and its connecting link to the length of the other of said elements and its connecting link being such that upon changes in the ambient temperature surrounding said elements the movements of said elements are balanced out thereby causing the pointer to remain stationary, heating means adjacent each of said bimetallic elements, and means controlled by the combined action of said temperature responsive means and said humidity responsive means for energizing said heating means whereby the temperature of one of said heating means is increased and the temperature of the other of said heating means is decreased thereby actuating the pointer by the differential movement of said bimetallic elements to indicate effective temperature.

2. In combination, means responsive to changes in temperature, means responsive to changes in humidity connected to said temperature responsive means, indicating means mounted for rotation over a scale, a pair of spaced apart temperature responsive members fixed at one end and arranged in parallel to move in one direction upon an equal increase in temperature and in an opposite direction upon an equal decrease in temperature, one of said temperature responsive members being shorter than the other, means connecting said temperature responsive members to said indicating means comprising a pair of articulated links, one of said links connecting the free end of the longer temperature responsive member to one end of the indicating means, the other of said links connecting the free end of the shorter temperature responsive member to the indicating means at an intermediate portion thereof, the ratio of the length of one of said members and its connecting link to the length of the other of said members and its connecting link being such that upon changes in the ambient temperature surrounding said members the movements of said members are balanced out thereby causing the indicating means to remain stationary, heating means adjacent each of said temperature responsive members, and means comprising an electrical circuit having current flow therein controlled by the combined action of said temperature responsive means and said humidity responsive means for energizing said heating means whereby the temperature of one of said heating means is increased and the temperature of the other of said heating means is decreased thereby actuating the indicating means in accordance with the differential movement of said temperature responsive members to indicate effective temperature.

KENNETH E. WHITNEY.
RALPH R. CHAPPELL.